United States Patent [19]

Bartholet et al.

[11] Patent Number: 4,503,924

[45] Date of Patent: Mar. 12, 1985

[54] HORIZONTAL ACTUATOR MECHANISM FOR THE LEGS OF A WALKING MACHINE

[75] Inventors: Stephen J. Bartholet, Orange; Armen H. Sivaslian, Newport Beach, both of Calif.

[73] Assignee: Odetics, Inc., Anaheim, Calif.

[21] Appl. No.: 476,566

[22] Filed: Mar. 18, 1983

[51] Int. Cl.³ .............................................. B62D 57/02
[52] U.S. Cl. ........................................ 180/8.6; 305/3
[58] Field of Search ................... 180/8.6, 8.1, 8.3, 8.4, 180/8.5, 7.2; 280/1.167; 305/1, 3

[56] References Cited

U.S. PATENT DOCUMENTS 4,202,423 5/1980 Soto ...................................... 180/8.6
4,462,476 7/1984 Shkolnik .............................. 180/8.6

FOREIGN PATENT DOCUMENTS 53-36867 5/1978 Japan ..................................... 180/8.1

Primary Examiner—John A. Pekar
Attorney, Agent, or Firm—Spensley, Horn, Jubas & Lubitz

[57] ABSTRACT

A leg mechanism and horizontal actuator therefor comprising a frame member, first, second, third and fourth elongate links arranged in a pantograph mechanism, with one corner of the pantograph providing the main mounting point for the leg mechanism, a pair of crank arms connected to two of the links and extending approximately perpendicular to the ends thereof adjacent the main mounting point, and a drive member connected between the first and second crank arms for controlling the angle therebetween.

9 Claims, 8 Drawing Figures

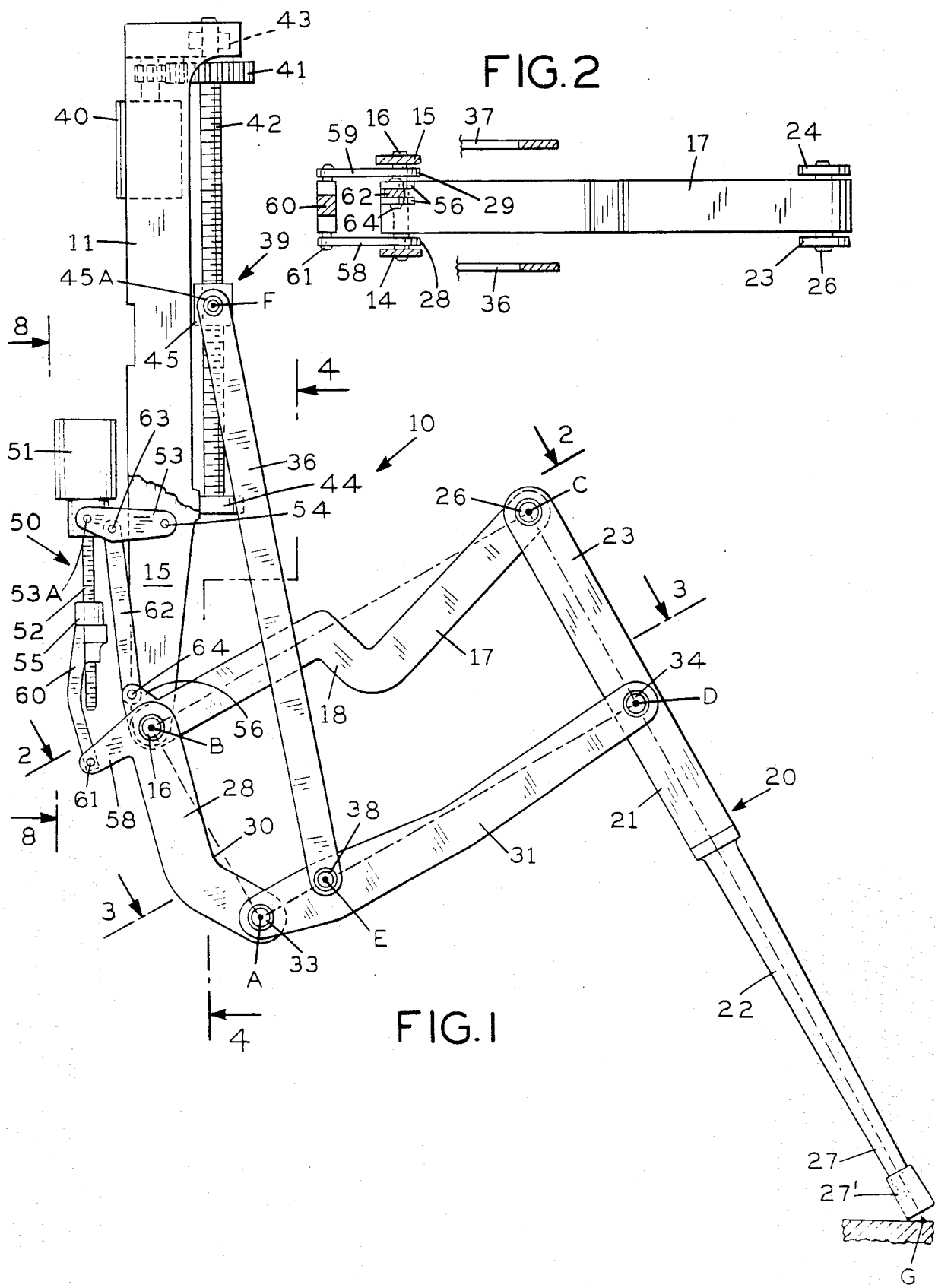

HORIZONTAL ACTUATOR MECHANISM FOR THE LEGS OF A WALKING MACHINE

BACKGROUND OF THE INVENTION

1. Field of the Invention

The present invention relates to a horizontal actuator mechanism for the legs of a walking machine and, more particularly, to a horizontal actuator mechanism for a pantograph leg mechanism for a walking machine which insures uniform and accurate horizontal movement of the leg mechanism regardless of its position.

2. Description of the Prior Art

It has long been known that it would be advantageous to develop a machine that walks rather than one driven by wheels or treads because a machine with legs can operate in areas and on terrain where wheeled or treaded vehicles cannot go. Knowing this, numerous attempts have been made over the years to develop a walking machine. However, the problems in developing such a machine have been so formidable that to this time, no satisfactory machine exists. These problems include coordinating the movement of the various legs, teaching the machine how to sense its environment so that each foot lands properly, and teaching the machine balance so that it does not fall over. The simple fact of the matter is that while walking is second nature to people and animals, it is extremely complex for computers and robots.

The computer, with its ability to process enormous amounts of data and actuate suitable commands, promises to make the control of the legs of a walking machine a manageable problem. As a result, a number of researchers around the world have been working on the development of various different types of walking machines.

In copending application Ser. No. 476,629, filed concurrently herewith, entitled Walking Machine, and assigned to Odetics, Inc., the assignee of the present application, there is disclosed a walking machine including a body having six legs attached thereto, extending therearound, in uniform positions around the body. As discussed in such application, by arranging a walking machine with a body and six uniformly spaced legs, the machine has the ability to maneuver in areas that are as small as a human being can maneuver in.

In copending application Ser. No. 476,583, filed concurrently herewith, entitled Vertical Actuator Mechanism for the Legs of a Walking Machine, and assigned to Odetics, Inc., the assignee of the present application, there is disclosed the basic details of a leg mechanism for a walking machine incorporating the concept of a pantograph which achieves isolation between the mechanisms which drive the machine foot horizontally and vertically. That application also teaches the broad concept of an actuator mechanism for driving the foot vertically. This vertical actuator mechanism maintains the vertical position of the foot as the foot is driven horizontally. That application does not, however, teach an actuator mechanism for driving the foot horizontally.

In copending application Ser. No. 476,558, filed concurrently herewith, entitled Leg Mechanism for Walking Machine, and assigned to Odetics, Inc., the assignee of the present application, there is disclosed a foldable leg mechanism which will allow the legs of a walking machine to fold compactly against the machine body. That application discloses but does not claim a horizontal actuator mechanism for the leg mechanism which is the subject of the present invention.

In copending application Ser. No. 476,583, long, swinging struts are used to drive the foot vertically while accommodating the horizontal motion of the vertical drive point. It is impractical to use the vertical drive point to achieve horizontal extension of the foot because such point moves up and down very large distances with the vertical motion. The overall system that the present invention is a part of accommodates the long struts of the vertical drive system rather efficiently. However, there is no room for long struts to accomplish a similar goal for the horizontal actuator mechanism. A simple and efficient system which does not rely on sliding actuators has been unknown heretofore.

SUMMARY OF THE INVENTION

According to the present invention, there is provided a horizontal actuator mechanism for the legs of a walking machine, including a plurality of links arranged in a pantograph mechanism, with one corner of the pantograph providing the main mounting point for each leg. Vertical actuation of the pantograph mechanism is accomplished by means of a pair of long, swinging struts connected between a drive nut and a point on the pantograph mechanism. The horizontal actuator mechanism is connected directly to two of the pantograph links, at the main mounting point of the pantograph mechanism, so as to eliminate the need for sliding mechanisms or long, swinging links.

With such an arrangement, the problem arises that the leverage that each link has to effect motion of the foot of the leg mechanism horizontally varies from maximum leverage to zero leverage depending upon how far in or out the foot is and how far up and down the foot is. According to the present invention this problem is solved in that horizontal actuation is achieved by providing a pair of crank arms, one on each of the links connected to the main mounting point. One crank arm effects the angular position of one link and the other crank arm effects the angular position of the other link. A prime mover, such as a motor, simply provides a force between these two crank arms such that the leverage from the actuator to the crank arms is proportioned properly for whatever mechanical advantage the links individually have for moving the foot horizontally, for whatever position the leg is in.

Briefly, a leg mechanism and horizontal actuator therefor constructed in accordance with the teachings of the present invention comprises a frame member, a first elongate link, a first end of the first link being pivotally connected to the frame member, a second link, a first end of the second link being pivotally connected to a second end of the first link, the second end of the second link forming a foot, a third link, a first end of the third link being pivotally connected to the frame member and the first end of the first link, a fourth link, a first end of the fourth link being pivotally connected to the second end of the third link, the second end of the fourth link being pivotally connected to an intermediate point on the second link, a vertical actuator mechanism operatively connected to the fourth link, and a horizontal actuator mechanism including a first crank arm connected to the first link and extending approximately perpendicular to the first end thereof, a second crank arm connected to the third link and extending approximately perpendicular to the first end thereof, and drive means connected between the first and second crank arms for controlling the angle therebetween.

According to the preferred embodiment of the present invention, the drive means comprises a motor, a jack screw driven by the motor, and a drive nut on the jack screw, and the horizontal actuator mechanism further comprises a fifth link connected between the first crank arm and the motor, a sixth link connected between the second crank arm and the drive nut, and a rocker arm connected between the motor and the frame member for limiting horizontal movement of the motor.

OBJECTS, FEATURES AND ADVANTAGES

It is, therefore, the object of the present invention to solve the problems associated with providing a horizontal actuator mechanism for the legs of a walking machine. It is a feature of the present invention to solve these problems by providing a horizontal actuator mechanism which applies its drive force between a pair of crank arms connected to leg links connected to the main mounting point of the leg mechanism. An advantage to be derived is a horizontal actuator mechanism in which the leverage from the actuator is proportioned properly for whatever mechanical advantage the links individually have for moving the foot horizontally, for whatever position the leg is in. Another advantage is a horizontal actuator mechanism for the legs of a walking machine including a lead screw wherein rotation of the lead screw is linearly proportional to the horizontal movement of the foot of the legs.

Still other objects, features and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein:

BRIEF DESCRIPTION OF THE DRAWINGS

FIG. 1 is a side elevation view of a leg mechanism for a walking machine incorporating a horizontal actuator mechanism constructed in accordance with the teachings of the present invention;

FIGS. 2, 3 and 4 are sectional views taken along the lines 2—2, 3—3 and 4—4, respectively, in FIG. 1;

DESCRIPTION OF THE PREFERRED EMBODIMENT

Figure 3:
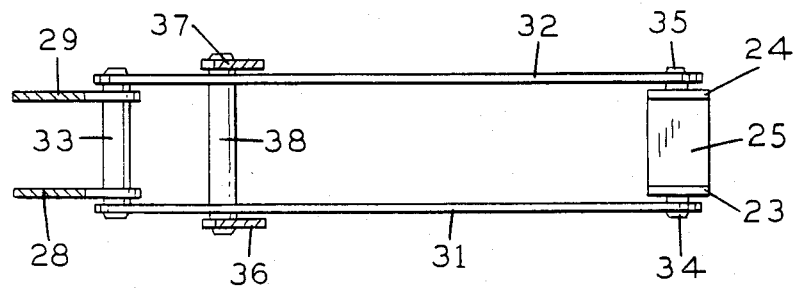
Figure 8:
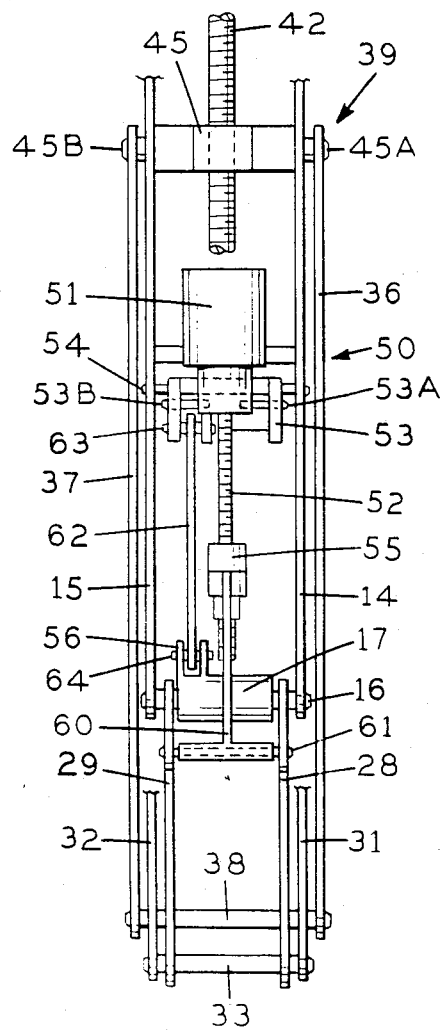
FIG. 8 is a rear elevation view taken in the direction of line 8—8 in FIG. 1.
Figure 4:
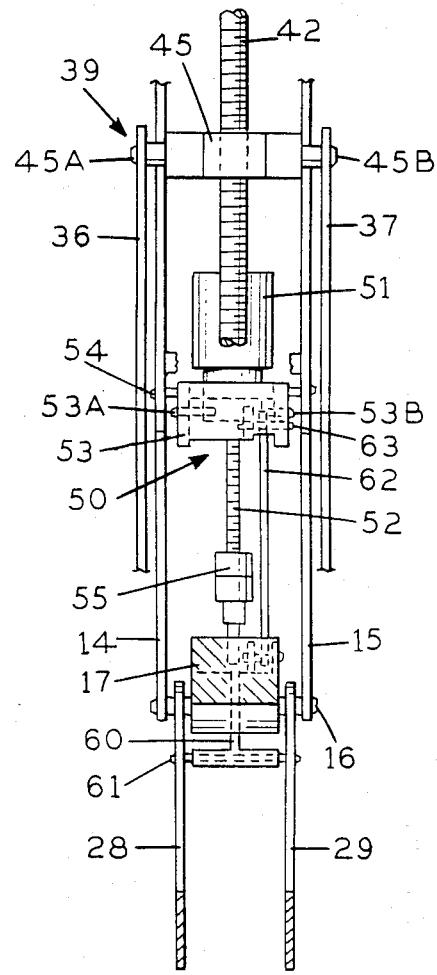

Referring now to the drawings and, more particularly, to FIGS. 1, 2, 3, 4 and 7 thereof, there is shown a leg mechanism, generally designated 10, for a walking machine. Reference should be had to the beforementioned copending application Ser. No. 476,558 for a complete description of leg mechanism 10 and the manner in which it will allow the legs of a walking machine to fold compactly against a machine body. Reference should also be had to the beforementioned copending application Ser. No. 476,629 for a more complete description of the manner in which leg mechanism 10 may be combined with a plurality of additional and identical leg mechanisms and attached to a body for forming a complete walking machine.

The construction of a complete walking machine is not directly relevant to the present invention, nor is the exact details of leg mechanism 10, the present invention being only directed to the actuator mechanism for controlling the horizontal position of the foot of a pantograph leg mechanism. However, the present invention will be described in its preferred embodiment, which is for use with the leg mechanism of application Ser. No. 476,558. Accordingly, a complete description of leg mechanism 10 will be provided.

Leg mechanism 10 includes an elongate, upright leg frame 11 which is adapted to be connected to a walking machine body (not shown) in a manner (not shown) which will permit pivotal movement of leg frame 11. Leg frame 11 has a pair of opposed, spaced, parallel sides 14 and 15. A pin 16 extends between sides 14 and 15, at the lower end of leg frame 11.

Leg mechanism 10 includes a plurality of elongate links arranged in a parallelogram to form a pantograph mechanism whereby forces applied at selected points on individual ones of the links can be transmitted to another link which forms the movable foot of the mechanism. More specifically, leg mechanism 10 includes a first elongate link 17 which may be viewed as forming the thigh of leg mechanism 10. Link 17 is a solid member having a dog leg, as shown at 18. Pin 16 extends through a first end of thigh 17 so as to pivotally connect thigh 17 to leg frame 11.

Leg mechanism 10 includes a second elongate link, generally designated 20, which forms the shin of leg mechanism 10. Link 20 is preferably made in two parts, an upper part 21 and a lower part 22, which are connected together in any suitable manner. Part 21 is a generally U-shaped member in that the upper portion thereof includes a pair of opposed, parallel sides 23 and 24, and the lower portion is a solid member, as shown at 25. First ends of sides 23 and 24 and the second end of link 17 are pivotally connected to each other by means of a pin 26. Sides 23 and 24 are positioned on opposite sides of the second end of link 17, as shown most clearly in FIGS. 2 and 7. This permits positioning of link 17 between sides 23 and 24 of link 20. It should also be noted that the lower end of part 22 of link 20 forms the foot 27 of leg mechanism 10, which foot 27 may conveniently be provided with a rubber cap 27'.

Leg mechanism 10 includes a pair of third elongate links 28 and 29, first ends of links 28 and 29 being pivotally connected to frame member 11, preferably by means of pin 16. According to the preferred embodiment of the invention, link 17 is positioned between links 28 and 29. Links 28 and 29 have a slight dog leg, as shown at 30 in FIG. 1.

The fourth side of the parallelogram is formed by a pair of elongate links 31 and 32, first ends of links 31 and 32 being pivotally connected to second ends of links 28 and 29, by means of a pin 33, with both of links 28 and 29 positioned between links 31 and 32. Second ends of links 31 and 32 are pivotally connected to an intermediate point on link 20, specifically part 21 of link 20, with part 21 of link 20 between links 31 and 32. So as to permit link 17 to pass between sides 23 and 24 of link 20, link 31 is connected to side 23 by a pin 34 and link 32 is connected to side 24 by a separate pin 35.

It will be readily appreciated by those skilled in the art, from an inspection of FIG. 1, that the arrangement of the links just described forms a pantograph mechanism with the various links formed into a parallelogram, the corners of which are defined by the letters A, B, C and D. The parallel sides of the parallelogram are shown by dotted lines. Point B, defined by pin 16, is the fixed point on the pantograph whereas foot 27 is the ultimate movable member thereof.

Vertical movement of foot 27 is controlled by a pair of actuator struts 36 and 3, first ends of struts 36 and 37 being pivotally connected to an intermediate point E on links 31 and 32, with links 31 and 32 positioned between struts 36 and 37. A single pin 38 extends between struts 36 and 37, through links 31 and 32. The second ends of struts 36 and 37 are connected to a leg actuator mechanism, generally designated 39, which is connected to leg frame 11.

More specifically, leg actuator mechanism 39 includes a motor 40 connected by means of suitable gearing 41 to a lead screw 42 which is mounted for rotation in leg frame 11 by a pair of bearings 43 and 44. A drive nut 45 is mounted on lead screw 42 so that drive nut 45 is driven vertically, either up or down, by rotation of lead screw 42. The second ends of struts 36 and 37 are pivotally connected to drive nut 45 by means of pins 45A and 45B, respectively. For a more complete description of the manner in which leg actuator mechanism 39 controls the vertical movement of foot 27, reference should be had to copending application Ser. No. 476,583.

According to the present invention, leg mechanism 10 includes a leg actuator mechanism, generally designated 50, for driving foot 27 horizontally. Leg actuator mechanism 50 includes a motor 51 which directly drives a lead screw 52. Motor 51 is pivotally mounted on one end of a U-shaped rocker arm 53 by means of a pair of pins 53A and 53B. The other end of rocker arm 53 is connected by means of a pin 54 between sides 14 and 15 of leg frame 11. Riding on lead screw 52 is a drive nut 55.

Link 17 incorporates a crank arm 56 made as an integral part therof, extending approximately perpendicular to the first end thereof, adjacent pin 16. Similarly, links 28 and 29 incorporate crank arms 58 and 59, respectively, made as integral parts thereof, extending approximately perpendicular to the first ends thereof, adjacent pin 16. A link 60 has a first end thereof made integral with drive nut 55 and a second end thereof connected to crank arms 58 and 59 by means of a pin 61. A link 62 has a first end thereof connected to one side of rocker arm 53 by means of a pin 63 and a second end thereof connected to crank arm 56 by means of a pin 64.

Figure 5:
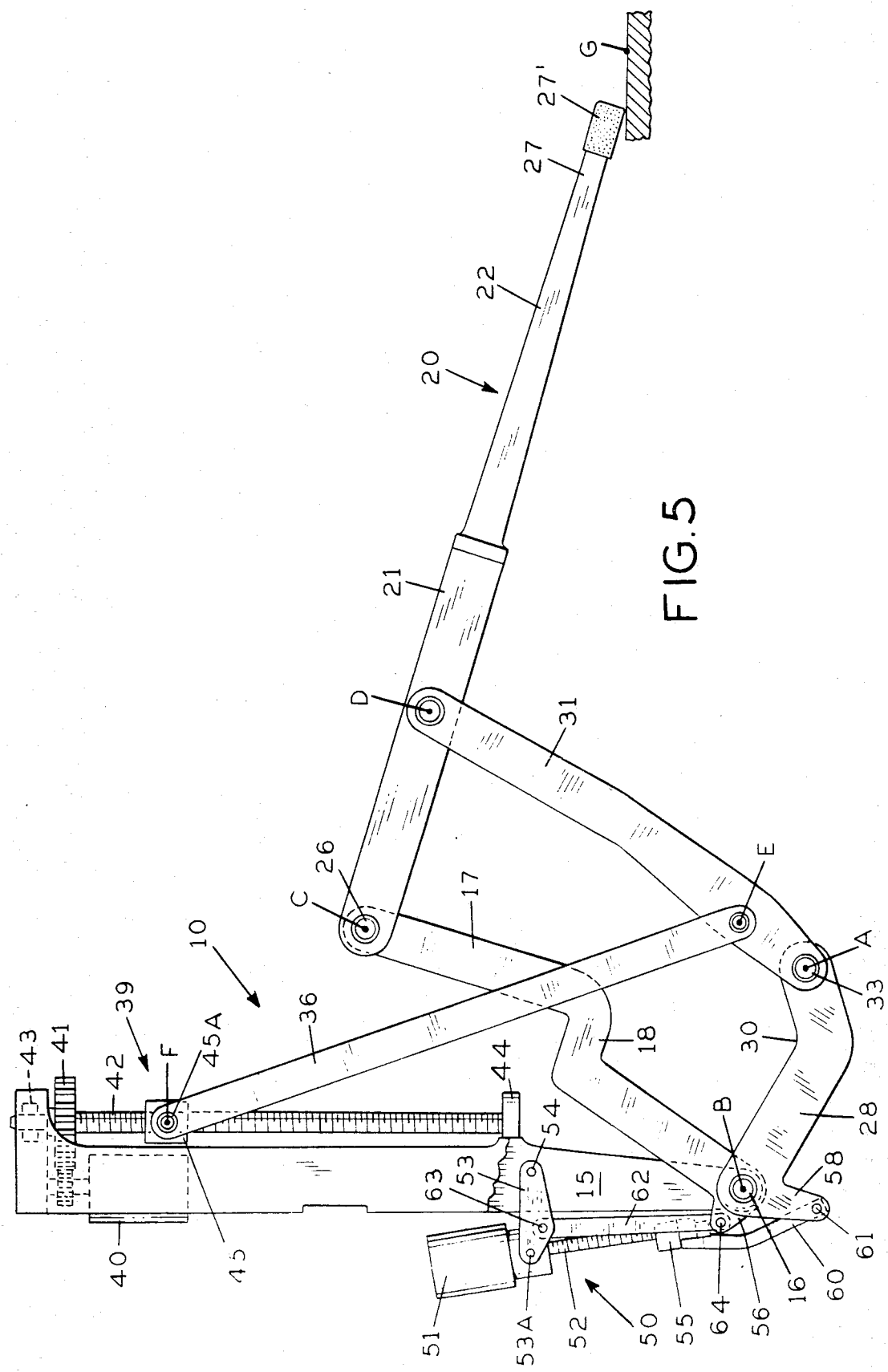
FIGS. 5 and 6 are additional side elevation views of the mechanism of FIG. 1 in different positions thereof.
Figure 6:
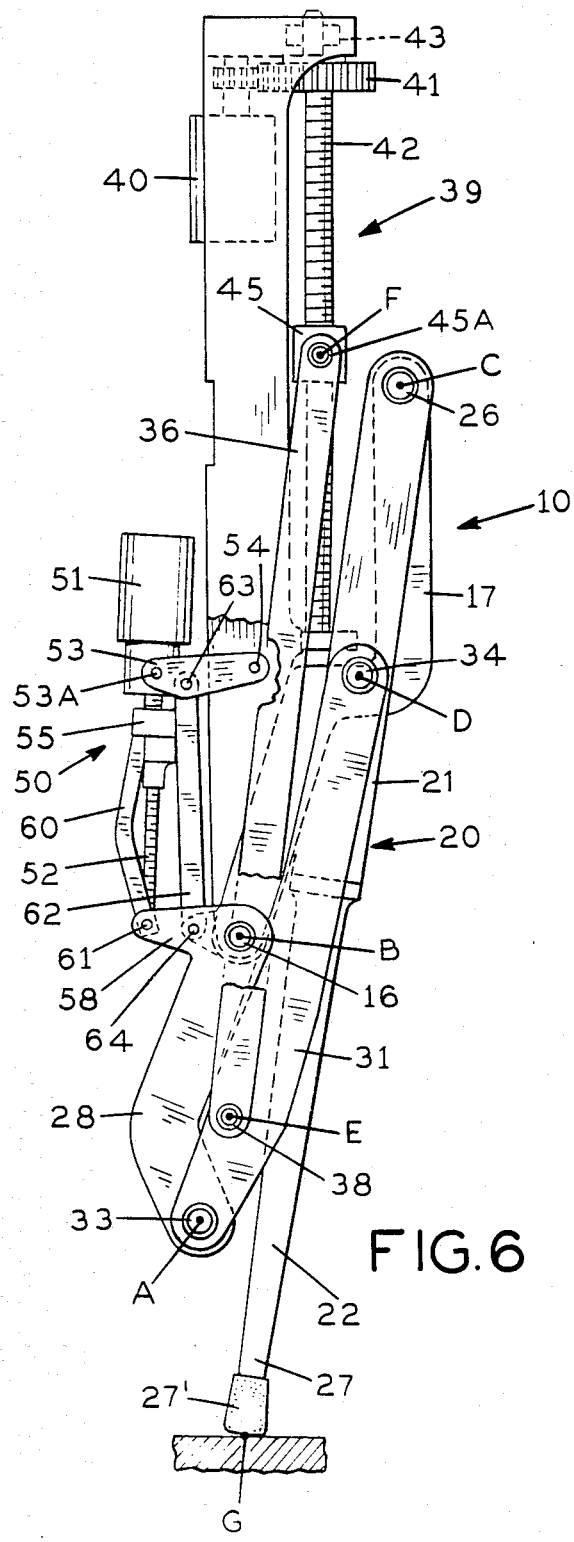
Figure 7:
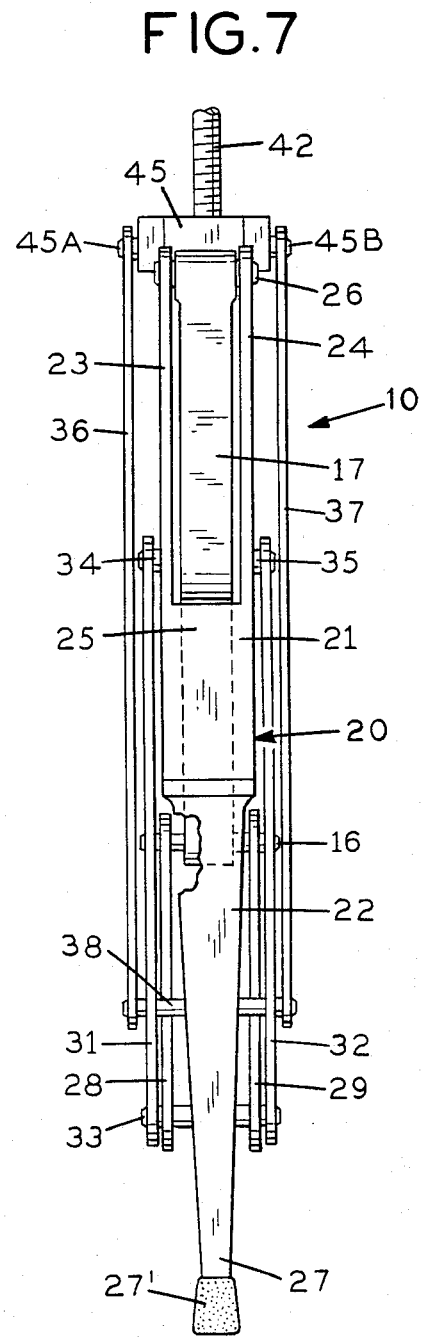
FIG. 7 is a front elevation view of the leg mechanism in the tucked position.

As can be seen from a comparison of FIGS. 1, 5 and 6, which show multiple different positions of leg mechanism 10, it is impractical to connect leg actuator mechanism 50 to vertical drive point E because point E moves up and down by very large distances with the vertical motion of foot 27. While leg mechanism 10 has room for long struts 36 and 37 for leg drive means 39, there is no room for corresponding struts to accomplish a similar goal for the horizontal movement of foot 27. Therefore, in order to avoid sliding actuators to accommodate the vertical motion of point E, horizontal motion of foot 27 is provided by directly actuating links 17 and 28/29 at the main mounting point B of pantograph leg mechanism 10.

The problem that arises by having leg drive means 50 actuate links 17 and 28/29 directly at mounting point B is that the leverage that link 17 has to effect motion of foot 27 horizontally and the leverage that links 28/29 have to effect motion of foot 27 horizontally varies from maximum leverage to zero leverage depending upon how far in or out foot 27 is and how far up and down foot 27 is. According to the present invention, this problem is solved by splitting the actuation force between links 17 and 28/29. When motor 51 rotates jack screw 52, it simply forces a change in distance between motor 51 and drive nut 55 thereby, through links 60 and 62, changing the angle between crank arms 56 and 58/59. The angles of crank arms 56 and 58/59 are proportioned properly for whatever mechanical advantage links 17 and 28/29 have for moving foot 27 horizontally, for whatever the position of leg mechanism 10 is.

The potential problem which is solved by the present invention can be seen from a comparison of FIGS. 1, 5 and 6. It is seen that when links 17 and 28/29 are both approximately vertical, both crank arms 56 and 58/59 are in position to have force applied thereto by drive motor 51. On the other hand, when link 17 approaches the horizontal position, as shown in FIG. 1, a point is reached where pin 64 is in line with pins 16 and 63 so that a force applied thereto is ineffective in moving leg mechanism 10. Similarly, as links 28 and 29 approach the horizontal position as shown, for example, in FIG. 5, a position is reached where pin 61 is aligned with drive nut 55 and pin 16 so that a force applied to crank arms 58 and 59 is ineffective in moving foot 27. For the entire operating range of foot 27, it will always be the case that one or the other of crank arms 56 and 58/59 will be effective in moving foot 27 when the other is not. At some locations, both crank arms will have nearly equal effectiveness. In any event, leg actuator mechanism 50 is arranged so as to automatically divide the motion of motor 51 in proportion to the link angles to accommodate whichever one has effective motion available.

It should be noted that the upper end of jack screw 52 (motor 51) is connected by means of rocker arm 53 and link 62 to crank arm 56 so that motor 51 can push or pull against crank arm 56 mounted on link 17. The upper end of link 62 could just as easily be connected directly to motor 51, but is connected to rocker arm 53 as a matter of convenience.

It should also be noted that motor 51 is floating relative to leg frame 11, in the sense that it is not rigidly connected thereto. Rocker arm 53 permits motor 51 to change its position as leg actuator mechanism 39 moves foot 27 vertically, independently of horizontal movement of foot 27. Rocker arm 53 is necessary to restrain horizontal movement of motor 51 so that all of the motion of drive nut 55 will be confined to tension and extension of links 17 and 28/29.

In other words, lead screw 52 and drive nut 55 are intended to apply vertical forces to cranks 56 and 58/59, which cranks are at angles of approximately 90° to links 17 and 28/29, which is what converts that vertical motion to horizontal motion of foot 27. In order to jack screws 52 to effectively apply such forces, it must be confined to move only in the vertical direction. The attachment point to crank arms 58 and 59 effects the confinement at the lower end of jack screw 52. Rocker arm 53 effects the confinement at the upper end of jack screw 52.

Another advantage results from the arrangement of leg actuator mechanism 50 just described. More specifically, the various components can be arranged and proportioned so that a given rotation of lead screw 52 will effect a proportional horizontal movement of foot 27, regardless of the extension position of foot 27 and regardless of the vertical position of foot 27. That is, by making the angular rotation of lead screw 52 linearly proportional to the horizontal movement of foot 27, a potentiometer can be mounted to sense the rotation of lead screw 52, the output of such potentiometer not only indicating the angular rotation of jack screw 52 but also indicating the horizontal position of foot 27. Such potentiometer output signal can be fed back to a computer controlling leg mechanism 10 so that the computer will always know what the horizontal position of foot 27 is, regardless of its vertical position.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. A leg mechanism and horizontal actuator therefor comprising:
   a frame member;
   a first elongate link, a first end of said first link being pivotally connected to said frame member;
   a second link, a first end of said second link being pivotally connected to a second end of said first link, the second end of said second link forming a foot;
   a third link, a first end of said third link being pivotally connected to said frame member and said first end of said first link;
   a fourth link, a first end of said fourth link being pivotally connected to the second end of said third link, the second end of said fourth link being pivotally connected to an intermediate point on said second link;
   vertical actuator means operatively connected to said fourth link; and
   horizontal actuator means operatively connected between said first and third links.

2. A leg mechanism and horizontal actuator therefor according to claim 1, wherein said horizontal actuator means comprises:
   a first crank arm connected to said first link and extending approximately perpendicular to said first end thereof;
   a second crank arm connected to said third link and extending approximately perpendicular to said first end thereof; and
   drive means connected between said first and second crank arms for controlling the angle therebetween.

3. A leg mechanism and horizontal actuator therefor according to claim 2, wherein said drive means comprises:
   a motor;
   a lead screw driven by said motor; and
   a drive nut on said lead screw; and wherein said horizontal actuator means further comprises:
   a fifth link connected between said first crank arm and said motor; and
   a sixth link connected between said second crank arm and said drive nut.

4. A leg mechanism and horizontal actuator therefor according to claim 3, wherein said horizontal actuator mechanism further comprises:
   means for limiting horizontal movement of said motor.

5. A leg mechanism and horizontal actuator therefor according to claim 4, wherein said horizontal movement limiting means comprises:
   a rocker arm connected between said motor and said frame member.

6. A leg mechanism and horizontal actuator therefor according to claim 3, wherein rotation of said lead screw is directly proportional to horizontal movement of said foot.

7. A leg mechanism and horizontal actuator therefor according to claim 6, further comprising:
   a potentiometer operatively connected to sense rotation of said lead screw, said potentiometer providing an output signal which is directly proportional to horizontal movement of said foot.

8. A leg mechanism and horizontal actuator therefor according to claim 3, wherein the relationship between angular rotation of said lead screw and horizontal movement of said foot is linear.

9. A leg mechanism and horizontal actuator therefor according to claim 8, further comprising:
   a potentiometer operatively connected to sense rotation of said lead screw, said potentiometer providing an output signal which is linearly proportional to horizontal movement of said foot.

* * * * *